(12) United States Patent
Baxter et al.

(10) Patent No.: US 9,169,385 B2
(45) Date of Patent: Oct. 27, 2015

(54) POWDERED RESINS WITH FILLERS

(71) Applicant: Georgia-Pacific Chemicals LLC, Atlanta, GA (US)

(72) Inventors: Paul S. Baxter, Conyers, GA (US); Raymond D. Fowler, Bethlehem, GA (US); John D. Cothran, Conyers, GA (US); Aubra K. Bunn, Covington, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 84 days.

(21) Appl. No.: 13/627,307

(22) Filed: Sep. 26, 2012

(65) Prior Publication Data

US 2013/0085211 A1  Apr. 4, 2013

Related U.S. Application Data

(60) Provisional application No. 61/541,508, filed on Sep. 30, 2011.

(51) Int. Cl.
| | |
|---|---|
| *C08L 97/02* | (2006.01) |
| *C08L 61/06* | (2006.01) |
| *C09J 161/06* | (2006.01) |
| *C08K 11/00* | (2006.01) |
| *B27N 3/04* | (2006.01) |
| *B32B 21/02* | (2006.01) |
| *C08K 3/34* | (2006.01) |

(52) U.S. Cl.
CPC . *C08L 61/06* (2013.01); *B27N 3/04* (2013.01); *B32B 21/02* (2013.01); *C08K 11/00* (2013.01); *C08L 97/02* (2013.01); *C09J 161/06* (2013.01); *C08K 3/346* (2013.01); *C08K 2201/005* (2013.01)

(58) Field of Classification Search
CPC .......... C08G 8/10; C08G 12/12; C08G 12/32; C08L 97/02; C08L 61/06; C09J 161/06; C09J 97/02
USPC ................................................. 528/129, 266
See application file for complete search history.

(56) References Cited

U.S. PATENT DOCUMENTS

| | | | |
|---|---|---|---|
| 2,492,510 A | 12/1949 | Van Epps | |
| 2,507,465 A | 5/1950 | Ayers | |
| 2,781,286 A | 2/1957 | Ayers et al. | |
| 3,285,805 A | 11/1966 | Bryner | |
| 3,956,204 A * | 5/1976 | Higginbottom | 524/25 |
| 3,957,703 A | 5/1976 | Ludwig et al. | |
| 4,070,314 A | 1/1978 | Alexander et al. | |
| 4,098,770 A * | 7/1978 | Berchem et al. | 525/480 |
| 4,105,606 A * | 8/1978 | Forss et al. | 524/73 |
| 4,146,527 A * | 3/1979 | Yamamoto et al. | 523/158 |
| 4,182,696 A * | 1/1980 | Wynstra et al. | 524/14 |
| 4,206,095 A * | 6/1980 | Wynstra et al. | 528/137 |
| 4,244,846 A | 1/1981 | Elder | |
| 4,324,747 A * | 4/1982 | Sudan et al. | 264/13 |
| 4,424,300 A * | 1/1984 | Udvardy et al. | 525/501 |
| 4,537,941 A * | 8/1985 | Kambanis et al. | 527/403 |
| 4,562,218 A * | 12/1985 | Fornadel et al. | 524/15 |
| 4,748,214 A * | 5/1988 | Asami et al. | 525/503 |
| 4,778,530 A | 10/1988 | Ayers | |
| 4,942,191 A | 7/1990 | Rogers | |
| 5,501,720 A * | 3/1996 | Buchholz | 71/28 |
| 6,497,760 B2 * | 12/2002 | Sun et al. | 106/131.1 |
| 6,608,162 B1 | 8/2003 | Chiu et al. | |
| 2003/0130395 A1 * | 7/2003 | Walisser | 524/384 |
| 2003/0203998 A1 | 10/2003 | Gres | |
| 2005/0070186 A1 * | 3/2005 | Shoemake et al. | 442/176 |
| 2005/0070635 A1 * | 3/2005 | Breyer et al. | 524/13 |
| 2006/0094853 A1 * | 5/2006 | Arbuckle | 528/128 |
| 2006/0234077 A1 * | 10/2006 | Breyer et al. | 428/528 |
| 2007/0100115 A1 * | 5/2007 | Schmid et al. | 528/128 |
| 2010/0086782 A1 * | 4/2010 | Yoshinaga et al. | 428/402 |
| 2010/0171233 A1 * | 7/2010 | Baxter et al. | 264/123 |
| 2010/0197185 A1 * | 8/2010 | Herbert | 442/327 |
| 2010/0273917 A1 * | 10/2010 | Breyer et al. | 524/14 |
| 2011/0136947 A1 | 6/2011 | Knight et al. | |
| 2011/0262760 A1 * | 10/2011 | Breyer et al. | 428/535 |
| 2012/0252937 A1 * | 10/2012 | Cannon et al. | 524/58 |

OTHER PUBLICATIONS

Waage et al. Journal of Applied Polymer Science, vol. 42, 273-278, 1991.*
International Search Report and the Written Opinion of the International Searching Authority for PCT/US2012/057812 mailed on Feb. 14, 2013.

\* cited by examiner

*Primary Examiner* — Liam J Heincer
(74) *Attorney, Agent, or Firm* — Ram W. Sabnis

(57) ABSTRACT

Particulate binder compositions and methods for making and using same are provided. The binder composition for producing composite lignocellulose products can include an aldehyde based resin and a filler, an extender, or a combination thereof. The binder composition can be in the form of particulates. The particulates can each comprises the filler, the extender, or the combination thereof and the aldehyde based resin.

20 Claims, No Drawings

POWDERED RESINS WITH FILLERS

CROSS-REFERENCE TO RELATED APPLICATION

This application claims priority to U.S. Provisional Patent Application having Ser. No. 61/541,508, filed Sep. 30, 2011, which is incorporated by reference herein.

BACKGROUND

1. Field

Embodiments described herein generally relate to particulate binder compositions for use in making composite products. More particularly, such embodiments relate to particulate binder compositions containing fillers and/or extenders for use in making lignocellulose-containing composite products.

2. Description of the Related Art

Powdered or particulate, curable aldehyde based resins, e.g., phenol-formaldehyde resole resins, have found wide use as an adhesive for a variety of lignocellulose composite products such as oriented strand board (OSB) and other similar wafer or chip board products. Phenol-formaldehyde resole resins are typically prepared by reacting a molar excess of formaldehyde with phenol under liquid, e.g., aqueous, alkaline reaction conditions. The resulting liquid phenol-formaldehyde resole resin is then spray-dried to produce the curable phenol-formaldehyde resin powder that is used as an adhesive.

Typical spray-dried phenol-formaldehyde resin powders produce lignocellulose products, e.g., oriented strand board, that meet or exceed desired physical properties, e.g., internal bond strength. The amount of spray-dried phenol-formaldehyde resin powder typically required to produce lignocellulose products having the desired physical properties, however, adds to the costs associated with producing lignocellulose composite products.

There is a need, therefore, for improved binder compositions for producing composite products, e.g., lignocellulose-containing composite products, and methods for making and using the same.

SUMMARY

Particulate binder compositions and methods for making and using same are provided. In one or more embodiments, a binder composition for producing composite lignocellulose products can include an aldehyde based resin and a filler, an extender, or a combination thereof. The binder composition can be in the form of particulates. The particulates can each comprises the filler, the extender, or the combination thereof and the aldehyde based resin.

In one or more embodiments, a method for producing a binder composition can include combining a filler, an extender, or a both with an aldehyde based resin in the presence of a liquid medium to produce a mixture. At least a portion of the liquid medium can be removed to produce a particulate binder composition, wherein each particulate comprises the filler, the extender, or the combination thereof and the aldehyde based resin.

In one or more embodiments, a method for producing a binder composition can include spray-drying an aerated liquid mixture that includes a filler, an extender, or a combination thereof and an aldehyde based resin to produce a spray-dried binder composition. The spray-dried binder composition can be in the form of particulates. Each particulate can include the filler, the extender, or the combination thereof and the aldehyde based resin.

In one or more embodiments, a composite product can include a plurality of lignocellulose substrates and an at least partially cured binder composition. The binder composition, prior to at least partial curing, can include an aldehyde based resin and a filler, an extender, or a combination thereof. The binder composition can be in the form of particulates. Each particulate can include the filler, the extender, or the combination thereof and the aldehyde based resin.

In one or more embodiments, a method for producing a particulate binder composition can include synthesizing a liquid phenol-formaldehyde resole resin. A filler, an extender, or both can be combined with the liquid phenol-formaldehyde resole resin in an amount sufficient to produce a mixture containing about 1 wt % to about 25 wt % of the filler, the extender, or both, based on the combined weight of the liquid phenol-formaldehyde resole resin solids and the filler, the extender, or both. The mixture can be agitated to produce an aerated mixture. The aerated mixture can be spray-dried to produce a spray-dried particulate binder composition, wherein each particulate comprises the filler, the extender, or the combination thereof and the aldehyde based resin.

In one or more embodiments, a method for making a composite product can include contacting a plurality of lignocellulose substrates with a particulate binder composition. The particulate binder composition can include an aldehyde based resin; and a filler, an extender, or a combination thereof. Each particulate can include the filler, the extender, or the combination thereof and the aldehyde based resin. The binder composition can be at least partially cured to produce a composite product.

In one or more embodiments, a binder composition for producing composite lignocellulose products can include mixture of a first plurality of particulates and second plurality of particulates. The first plurality of particulates can include one or more aldehyde based resins. The second plurality of particulates can include one or more fillers, one or more extenders, or a combination thereof.

In one or more embodiments, a method for producing a binder composition can include removing at least a portion of a liquid medium combined with an aldehyde based resin to produce a first plurality of particulates. The method can also include combining the first plurality of particulates with a second plurality of particulates to produce a binder composition. The second plurality of particulates can include one or more fillers, one or more extenders, or a combination thereof.

In one or more embodiments, a method for producing a binder composition, can include spray-drying an aerated liquid mixture that includes one or more aldehyde based resins to produce a first plurality of particulates. The method can also include combining the first plurality of particulates with a second plurality of particulates to produce a binder composition. The second plurality of particulates can include one or more fillers, one or more extenders, or a combination thereof.

In one or more embodiments, a composite product can include a plurality of lignocellulose substrates and an at least partially cured binder composition. The binder composition, prior to at least partial curing, can include a mixture of a first plurality of particulates and a second plurality of particulates. The first plurality of particulates can include one or more aldehyde based resins. The second plurality of particulates can include one or more fillers, one or more extenders, or a combination thereof.

In one or more embodiments, a method for producing a particulate binder composition can include synthesizing a liquid phenol-formaldehyde resole resin. The the liquid phenol-formaldehyde resin can be agitated to produce an aerated phenol-formaldehyde resole resin. The method can also include spray-drying the aerated phenol-formaldehyde resole resin to produce a spray-dried particulate phenol-formaldehyde resole resin. The spray-dried particulate phenol-formaldehyde resole resin can be combined with one or more fillers, one or more extenders or a combination thereof to produce a binder composition. The one or more fillers, the one or more extenders, or the combination thereof can be in particulate form.

In one or more embodiments, a method for making a composite product can include contacting a plurality of lignocellulose substrates with a particulate binder composition. The particulate binder composition can include a mixture of a first plurality of particulates and a second plurality of particulates. The first plurality of particulates can include one or more aldehyde based resins. The second plurality of particulates can include one or more fillers, one or more extenders, or a combination thereof. The method can also include at least partially curing the binder composition to produce a composite product.

DETAILED DESCRIPTION

The particulate binder composition can include one or more aldehyde based resins and one or more fillers and/or one or more extenders. In one or more embodiments, the discrete or individual particulates of the binder composition can include the aldehyde based resin and the filler and/or extender. In one or more embodiments, the discrete or individual particulates of the binder composition can be either the aldehyde based resin, the filler, or the extender. Said another way, the binder composition can include a mixture of a first plurality of particulates that include the aldehyde based resin and a second plurality of particulates that include the filler, the extender, or a combination of the filler and extender. The first plurality of particulates can be free from any intentionally added filler and/or extender. The second plurality can be free from any intentionally added aldehyde based resin. The particulate binder composition that includes the aldehyde based resin and the filler and/or extender can be used to produce a lignocellulose-containing composite product or "composite product" that meets certain physical property requirements while requiring less aldehyde based resin as compared to a comparative lignocellulose-containing composite product or "comparative composite product" having the same aldehyde based resin, but no filler or extender.

For example, the composite product produced with the particulate binder composition having the aldehyde based resin and the fillers and/or extender can include about 1 %, about 3 %, about 5 %, about 7 %, about 8 %, about 10 %, about 12 %, about 14 %, about 16 %, about 18 %, about 20 %, about 22 %, about 24 %, or about 26 % less aldehyde based resin as compared to the amount of aldehyde based resin present in the comparative composite product. In another example, the presence of the one or more fillers and/or extenders in the particulate binder composition can be used to produce a composite product that contains from about 1 % to about 25 %, about 5 % to about 20 %, about 5 % to about 18 %, or about 7 % to about 15 % less aldehyde based resin as compared to the amount of aldehyde based resin present in the comparative composite product. In another example, the amount of aldehyde based resin in the composite product produced with the binder composition that includes the aldehyde based resin and the one or more fillers and/or extenders can be reduced by an amount ranging from a low of about 1 %, about 3 %, about 6 %, or about 8 % to a high of about 14 %, about 16 %, about 18 %, about 20 %, about 22 %, about 24 %, or about 26 % relative to the amount of the aldehyde based resin present in the comparative composite product, with suitable ranges including the combination of any two values.

One or more properties of the composite product that can remain about the same and/or improve when produced with the particulate binder composition that includes the aldehyde based resin and the filler and/or extender, as compared to the comparative composite product, can include, but is not limited to, internal bond strength (TB), bond durability, e.g., boiled internal bond "BIB," water absorption, thickness swell, and bending, e.g., modulus of rupture "MOR," modulus of elasticity "MOE," maximum moment "MM," and modulus of inertia "EL." For example, the internal bond strength of a composite product produced with the particulate binder composition that includes the aldehyde based resin and the one or more fillers and/or extenders can be equal to or greater than the internal bond strength of the comparative product.

Processes for producing the particulate binder composition, such as spray-drying, freeze drying, vacuum drying, precipitation, air drying, and dry spinning a liquid mixture that includes the aldehyde based resin and the one or more fillers and/or extenders to produce a particulate or powdered binder composition are well known to those skilled in the art and a detailed description of the equipment and process variables are unnecessary. The aldehyde based resin can be mixed, blended, or otherwise combined with the one or more fillers and/or extenders in the presence of a liquid medium to produce a liquid mixture and the liquid mixture can be spray dried to produce the particulate binder composition, where each particulate includes the aldehyde based resin and the one or more fillers and/or extenders.

The aldehyde based resin can be combined with the one or more fillers and/or extenders in the presence of a liquid medium by mechanical agitation, e.g., magnetic sir bar, impellers, blades, and the like. In another example, ultrasonic sound waves can be used to combine the mix, blend, or otherwise combine the aldehyde based resin and the one or more fillers and/or extenders. During mixing of the aldehyde based resin and the one or more fillers and/or extenders, air or other suitable gas or combination of gases can be injected into the mixture to further increase the amount of entrained or retained gas therein.

The one or more fillers and/or extenders can also be mixed, blended, or otherwise combined with the aldehyde based binder during the production of the aldehyde based binder. For example, as discussed and described below, a suitable aqueous phenol-formaldehyde resole resin composition can be produced by reacting phenol and formaldehyde in water under an alkaline condition so as to yield a phenol-formaldehyde resole resin. The one or more fillers and/or extenders can be combined with one of the reactants, i.e., phenol or formaldehyde, with both of the reactants, i.e., phenol and formaldehyde, or with the aqueous mixture of phenol and formaldehyde.

The processes for producing the particulate binder composition, such as spray-drying, freeze drying, vacuum drying, precipitation, air drying, and dry spinning can also be used to produce particulates that only include the aldehyde resin. Said another way, particulates of the aldehyde based resin without the presence of the fillers or extenders can be produced via these known processes and the aldehyde based resin particulates and particulates of the filler and/or extender can be mixed, blended, or otherwise combined with one another to produce the particulate binder composition that includes discrete particulates of the aldehyde based resin and discrete particulates of the filler and/or the extender. Accordingly, suitable binder compositions can include, but are not limited to, (1) discrete particulates that include a mixture of the aldehyde based resin and at least one of the filler and extender, (2) discrete particulates that include a mixture of the aldehyde based resin particulates and at least one of the filler and extender in particulate form, or (3) a combination of (a) particulates that include both the aldehyde based resin and at least one of the filler and extender and (b) at least one of aldehyde based resin particulates that do not include the filler or extender, particulates of the filler that do not include the aldehyde based resin, and particulates of the extender that do not include the aldehyde based resin.

Spray drying refers to the process of atomizing (in the form of small droplets) the liquid mixture into a gas stream (often a heated air stream) under controlled temperature conditions and under specific gas/liquid contacting conditions to effect evaporation of the liquid from the atomized droplets and production of a dry particulate solid product or particulate binder composition or "spray dried binder composition." In the spray drying process, the liquid mixture of the aldehyde based resin and, optionally, the one or more fillers and/or extenders, such as an aqueous mixture of a phenol-formaldehyde resole resin and one or more fillers and/or extenders, can be atomized to small droplets and mixed with hot air (e.g., air at an inlet temperature usually between about 140° C. and about 250° C.) to evaporate the liquid from the droplets. The temperature of the mixture during the spray-drying process is usually close to or greater than the boiling temperature of the liquid, e.g., the water. An outlet air temperature of between about 60° C. and about 120° C. is common. Due to the curable (thermosetting) character of the aldehyde based resin, adjusting the operation of the spray-drying process to achieve thorough evaporation of the liquid at the lowest possible inlet and outlet temperatures is generally desired.

Spray drying is typically carried out with pressure nozzles (nozzle atomization—including two fluid nozzles) or centrifugal or rotary atomizers operating at high speeds (e.g., a spinning disc). Despite the high velocity generation of droplets, a spray dryer is designed so that the droplets avoid a much as possible contact with the spray dryer wall under proper operating procedures. This effect is achieved by a precise balance of atomizer velocity, air flow, spray dryer dimensions, e.g., height and diameter, and the design of inlet and outlet means to produce a cyclonic flow of gas, e.g., air in the chamber. A pulse atomizer can also be used to produce the small droplets needed to facilitate evaporation of the liquid. In some cases, it can be desirable to include a flow promoter, such as calcium stearate and/or an aluminosilicate material, in the liquid dispersion that is processed in a spray dryer simply to facilitate subsequent handling and transport of the spray dried binder composition (e.g., to avoid clumping).

The aeration level of the liquid mixture, also known as the gas volume fraction (GVF), created by the agitation of the liquid aldehyde based resin and/or, optionally, the liquid mixture of the aldehyde based resin and the one or more fillers and/or extenders can be selected such that the liquid or liquid mixture to be spray-dried has a GVF of at least 1 %, at least 2 %, at least 3 %, at least 4 %, at least 5 %, at least 6 %, at least 7 %, at least 8 %, at least 9 %, at least 10 %, at least 11 %, at least 12 %, at least 13 %, at least 14 %, at least 15 %, at least 16 %, at least 17 %, at least 18 %, at least 19 %, at least 20 %, or more than 20 %, based on the liquid volume of the de-aerated liquid or liquid mixture. In another example, the aeration level of the liquid or liquid mixture can range from a low of about 1 wt %, about 3 wt %, about 5 wt %, or about 7 wt % to a high of about 13 w %, about 15 wt %, about 17 wt %, or about 19 wt %, with suitable ranges including the combination of any two values. Those skilled in the art can select an appropriate technique for determining/monitoring the GVF of the liquid or liquid mixture to be spray-dried. For example, suitable techniques are discussed and described in U.S. Pat. Nos. 7,343,818 and 7,596,987. As recognized by one skilled in the art, the level of aeration of a liquid (GVF) also can be assessed by comparing the difference between the observed aerated density and the actual de-aerated density of the liquid.

The particle size and liquid content of the particulate binder composition, e.g., prepared via spray drying, is a complex function of the air feed rate and temperature, liquid feed rate and temperature, liquid droplet size and the solids concentration of the feed liquid. The particulate binder composition can have a liquid content of less than about 10 wt %, less than about 8 wt %, less than about 6 wt %, less than about 4 wt %, less than about 3 wt %, less than about 2 wt %, or less than about 1 wt %. For example, the particulates of the binder composition can have a liquid, e.g., water, concentration ranging from a low of about 0.5 wt %, about 1 wt %, about 1.5 wt %, or about 2 wt % to a high of about 5 wt %, about 6 wt %, about 8 wt %, or about 9 wt %, with suitable ranges including the combination of any two values. In another example, the liquid, e.g., water, content of the spray-dried powder can be less than about 6.5 wt %, or less than about 5.5 wt %, or less than about 5 wt %, or less than about 4.5 wt %, or less than about 3.5 wt %.

The particle size distribution, liquid, e.g., water, content, and bulk density of a spray dried particulate binder composition can be controlled by operations well known in the spray drying art by variables such as feed resin solids content of the liquid mixture, surface tension, speed of the rotary atomizer, feed rate of the liquid resin, and the temperature differences between the inlet and outlet (atomization gas temperature). Particle size distribution may be an important factor in production of a particulate binder composition.

The particulate binder composition, e.g., the spray dried binder, can be a free-flowing powder that is easily handled. The particulate binder composition can have an average particle size ranging from about 0.1 μm to about 150 μm. For example, the average particle size of the particulate binder composition can range from a low of about 1 μm, about 5 μm, about 10 μm, or about 20 μm to a high of about 50 μm, about 75 μm, about 100 μm, about 125 μm, or about 150 μm, with suitable ranges including the combination of any two values. In another example, the particulate binder composition can have an average particle size ranging from a low of about 0.1 μm, about 0.5 μm, about 1 μm, about 2 μm, about 3 μm, or about 5 μm to a high of about 20 μm, about 25 μm, about 30 μm, about 35 μm, about 40 μm, about 45 μm, or about 50 μm, with suitable ranges including the combination of any two values. In another example, the average particle size of the particulate binder composition can range from about 3 μm to about 90 μm, about 10 μm to about 80 μm, about 20 μm to about 70 μm, about 35 μm to about 75 μm, about 40 μm to about 65 μm, about 1 μm to about 20 μm, about 3 μm to about 30 μm, about 10 μm to about 20 μm, about 5 μm to about 40 μm, or about 5 μm to about 35 μm. In another example, about 80 wt % to about 90 wt % of the particulate binder composition can have a particle size of less than about 100 μm, less than about 85 μm, or less than about 75 μm. In another example, about 60 wt % to about 70 wt % of the particulate binder composition can have a particle size of less than about 60 μm, less than about 50 μm, or less than about 45 μm. If a desired particle size is not produced directly by the technique used to produce the particulate binder composition, additional mechanical grinding can be employed to reduce the distribution of the particle sizes further.

Each particulate of the binder composition can include anywhere from about 1 to about 100 individual or discrete particles of the filler and/or extender. For example, the number of discrete particles of the filler and/or extender distributed throughout each particulate of the binder composition can range from a low of about 1, about 2, about 3, about 4, or about 5 to a high of about 10, about 20, about 30, about 40, or about 50, with suitable ranges including the combination of any two values. In another example, the number of discrete particles of the filler and/or extender distributed throughout each particulate of the binder composition can range from 1 to about 2, from 1 to about 3, from 1 to about 4, from 1 to about 5, from about 2 to about 10, from about 3 to about 6, from about 1 to about 15, or from about 4 to about 12. Alternatively, as discussed and described above or elsewhere herein, each particulate of the binder composition can be either the aldehyde based resin, the filler, or the extender. Said another way, the particulate binder composition can be or include a mixture of discrete particulates composed of the aldehyde based resin, i.e., the filler and extender are not included in the discrete particles composed of the aldehyde based resin, and discrete particulates composed of the filler, the extender, or a combination of the filler and the extender.

The individual particulates of the binder composition can have the same composition throughout. In other words, any given particulate of the binder composition can have the same composition throughout that particulate. Said another way, the composition of the particulates can include both the filler and/or extender and the aldehyde based resin dispersed throughout the body of the particulate. Alternatively, the individual particulates of the binder composition can have different compositions with respect to one another. For example, some of the individual particulates (first plurality of particulates) can be composed of the aldehyde based resin without the presence of the filler or extender therein and some of the individual particulates (second plurality of particulates) can be composed of the filler and/or extender without the presence of the aldehyde based resin therein.

When the individual particulates of the particulate binder composition include both the aldehyde based resin and at least one of the filler or the extender, the amount of the one or more fillers and/or extenders in each particulate of the binder composition can be the same or different with respect to any two individual particles or particulates. The amount of the one or more fillers and/or extenders in the particulates of the binder composition can range from about 0.5 wt % to about 30 wt %, based on the combined weight of the aldehyde based resin solids and the fillers and/or extenders. For example, the amount of the one or more fillers and/or extenders in the particulates of the binder composition can range from a low of about a low of about 1 wt %, about 3 wt %, about 5 wt %, about 7 wt %, or about 9 wt % to a high of about 14 wt %, about 16 wt %, about 18 wt %, about 20 wt %, about 22 wt %, about 24 wt %, or about 26 wt %, based on the combined weight of the aldehyde based resin solids and the fillers and/or extenders, with suitable ranges including the combination of any two values. In another example, the amount of the one or more fillers and/or extenders in the particulates of the binder composition can range from about 2 wt % to about 7 wt %, about 4 wt % to about 12 wt %, about 8 wt % to about 17 wt %, about 10 wt % to about 22 wt %, or about 4 wt % to about 16 wt %, based on the combined weight of the aldehyde based resin solids and the fillers and/or extenders. In another example, the particulates of the binder composition can include from about 1 wt % to about 26 wt %, or about 2 wt % to about 20 wt %, or about 4 wt % to about 16 wt % of the one or more fillers, from about 1 wt % to about 26 wt %, or about 2 wt % to about 20 wt %, or about 4 wt % to about 16 wt % of the one or more extenders, and/or from about 1 wt % to about 26 wt %, or about 2 wt % to about 20 wt %, or about 4 wt % to about 16 wt % of a combination of the one or more fillers and one or more extenders, based on the combined weight of the aldehyde based resin solids and the fillers and/or extenders.

When the particulate binder composition includes a mixture of discrete aldehyde based resin particulates, i.e., the discrete aldehyde based resin particulates do not include the filler or the extender, (first plurality of particulates), and discrete filler and/or extender particulates (second plurality of particulates), the amount of the one or more fillers and/or extenders in the particulate binder composition can range from about 0.5 wt % to about 30 wt %, based on the combined weight of the discrete aldehyde based resin particulates and the discrete filler and/or extender particulates. For example, the amount of the one or more fillers and/or extenders in the particulate binder composition that includes a mixture of discrete aldehyde based resin particulates and discrete filler and/or extender particulates can range from a low of about a low of about 1 wt %, about 3 wt %, about 5 wt %, about 7 wt %, or about 9 wt % to a high of about 14 wt %, about 16 wt %, about 18 wt %, about 20 wt %, about 22 wt %, about 24 wt %, or about 26 wt %, based on the combined weight of the discrete aldehyde based resin particulates and the discrete filler and/or extender particulates, with suitable ranges including the combination of any two values. In another example, the amount of the one or more fillers and/or extenders in the particulate binder composition that includes a mixture of discrete aldehyde based resin particulates and discrete filler and/or extender particulates can range from about 2 wt % to about 7 wt %, about 4 wt % to about 12 wt %, about 8 wt % to about 17 wt %, about 10 wt % to about 22 wt %, or about 4 wt % to about 16 wt %, based on the combined weight of the discrete aldehyde based resin particulates and the discrete filler and/or extender particulates. In another example, the binder composition composed of a mixture of discrete aldehyde based resin particulates and discrete filler and/or extender particulates can include from about 1 wt % to about 26 wt %, or about 2 wt % to about 20 wt %, or about 4 wt % to about 16 wt % of the one or more fillers, from about 1 wt % to about 26 wt %, or about 2 wt % to about 20 wt %, or about 4 wt % to about 16 wt % of the one or more extenders, and/or from about 1 wt % to about 26 wt %, or about 2 wt % to about 20 wt %, or about 4 wt % to about 16 wt % of a combination of the one or more fillers and one or more extenders, based on the combined weight of the discrete aldehyde based resin particulates and the discrete filler and/or extender particulates.

In at least one example, the particulate binder composition can include a mixture of a first particulate binder composition containing a first aldehyde based resin and one or more fillers and a second particulate binder composition containing a second aldehyde based resin and one or more extenders. The first aldehyde based resin and the second aldehyde based resin can be the same or different. For example, both the first and second aldehyde based resins can be a phenol-formaldehyde resole resin. In another example, either the first aldehyde based resin or the second aldehyde based resin can be a phenol-formaldehyde resole resin and the other can be a urea-formaldehyde resin. In at least one other example, the particulate binder composition can include a mixture of a first particulate binder composition containing a first aldehyde based resin and a first filler and a second particulate binder composition containing a second aldehyde based resin and a second filler and/or one or more extenders. The first aldehyde based resin and the second aldehyde based resin can be the same or different. The first filler and the second filler can be the same or different. In at least one other example, the particulate binder composition can include a mixture of a first particulate binder composition containing a first aldehyde based resin and a first extender and a second binder composition containing a second aldehyde based resin and a second extender and/or one or more fillers. The first aldehyde based resin and the second aldehyde based resin can be the same or different. The first extender and the second extender can be the same or different.

Similarly, the binder composition that includes a mixture of discrete aldehyde based resin particulates and discrete filler and/or extender particulates can include one or more aldehyde based resin particulates and at least one of the one or more discrete filler particulates, and the one or more discrete extender particulates. For example, the particulate binder composition can include a mixture of one or more first discrete aldehyde based resin particulates, one or more second discrete aldehyde based resin particulates, and at least one of the discrete filler particulates and the discrete extender particulates.

The particulate binder composition can have a packed bulk density ranging from about 0.15 g/cm$^3$ to about 0.85 g/cm$^3$. For example, the packed bulk density of the particulate binder composition can range from a low of about 0.15 g/cm$^3$, about 0.3 g/cm$^3$, about 0.35 g/cm$^3$, about 0.4 g/cm$^3$, or about 0.45 g/cm$^3$ to a high of about 0.6 g/cm$^3$, about 0.65 g/cm$^3$, about 0.7 g/cm$^3$, about 0.75 g/cm$^3$, about 0.8 g/cm$^3$, or about 0.85 g/cm$^3$, with suitable ranges including the combination of any two values. In another example, the particulate binder composition can have a packed bulk density of about 0.45 g/cm$^3$ to about 0.57 g/cm$^3$, about 0.4 g/cm$^3$ to about 0.6 g/cm$^3$, about 0.55 g/cm$^3$ to about 0.75 g/cm$^3$, or about 0.35 g/cm$^3$ to about 0.65 g/cm$^3$. In another example, the particulate binder composition can have a packed bulk density of less than about 0.68 g/cm$^3$, less than about 0.6 g/cm$^3$, less than about 0.58 g/cm$^3$, or less than about 0.57 g/cm$^3$.

The particulate binder composition can have a stroke time ranging form a low of about 1 second, about 3 seconds, or about 5 seconds to a high of about 25 seconds, about 30 seconds, or about 35 seconds, with suitable ranges including the combination of any two values. For example, the particulate binder composition can have a stroke time ranging from about 5 seconds to about 25 seconds, about 8 seconds to about 16 seconds, or about 10 seconds to about 18 seconds.

The particulate binder composition can have a fusion diameter ranging from a low of about 14 mm, about 18 mm, about 21 mm, or about 25 mm to a high about 45 mm, about 50 mm, about 55 mm, or about 60 mm. For example, the particulate binder composition can have a fusion diameter of about 15 mm to about 40 mm, about 20 mm to about 35 mm, about 25 mm to about 30 mm, about 25 mm to about 50 mm, or about 15 min to about 35 mm One or more additional additives or modifiers can be combined with the particulate binder composition and/or the liquid mixture of the aldehyde based resin and the filler and/or extender and/or any one or more of the liquid aldehyde based resin, the filler, and the extender when the binder composition includes a mixture of discrete aldehyde based resin particulates and discrete filler and/or extender particulates. Illustrative additives or modifiers can include, but are not limited to, catalysts, other cure promoters or accelerators (e.g., alkali metal and alkaline earth metal carbonates and hydroxides, such as sodium hydroxide), thickeners, adduct-forming agents (e.g., urea), tack promoters (e.g., borax), foaming agents, defoamers, and/or surfactants. For example, one or more surfactants, such as nonionic surfactants, can be combined with the liquid mixture of the aldehyde based resin and the one or more fillers and/or extenders to adjust or control a packed bulk density of the spray dried binder composition, as discussed and described in U.S. Patent Application Publication No. 2011/0136947.

The aldehyde based resin can include, but is not limited to, one or more urea-aldehyde resins, one or more melamine-aldehyde resins, one or more phenol-aldehyde resins, e.g., phenol-formaldehyde novolac resin and/or phenol-formaldehyde resole resin, one or more dihydroxybenzene or "resorcinol"-aldehyde resins, one or more phenol-resorcinol-aldehyde resins, one or more melamine-urea-aldehyde resins, one or more phenol-urea-aldehyde resins, or any combination thereof. In one example, the aldehyde based resin can be or include a phenol-formaldehyde resin. The phenol-formaldehyde resin can be a phenol-formaldehyde resole resin.

Referring to phenol-formaldehyde resole resin in particular, the resin can be a phenol-formaldehyde resin prepared under liquid, e.g., aqueous, alkaline reaction conditions using a molar excess of formaldehyde. For example, the phenol-formaldehyde resole resin can have a molar ratio of formaldehyde to phenol ranging from a low of about 1.7, about 1.8, or about 1.9 to a high of about 2.5, about 2.6, or about 2.7, with suitable ranges including the combination of any two values. For example, suitable phenol-aldehyde resins can have a molar ratio of formaldehyde to phenol ranging from about 1.8 to about 2.65, about 2.1 to about 2.65, about 2.2 to about 2.5, about 2.3 to about 2.5, about 2.4 to about 2.55, about 2.45 to about 2.5, about 2.4 to about 2.5, or about 2.05 to about 2.55. Phenol-formaldehyde resins prepared within such a molar ratio range typically have a weight average molecular weight in the range of about 1,000 Daltons to about 8,000 Daltons. Such resin compositions are commonly referred to as "resole resins." As used herein, the term "formaldehyde to phenol molar ratio" and "F:P molar ratio" are used interchangeably and refer to the total amount, in moles, of the formaldehyde compound(s) combined with each mole of the phenol compound(s) and assumes no loss of the formaldehyde or phenol compounds through volatilization, hydrolysis, or other means.

The phenol-formaldehyde resole resin can have can have a pH ranging from a low of about 7, about 8, or about 9 to a high of about 11, about 12, or about 13, with suitable ranges including the combination of any two values. The phenol-formaldehyde resole resin can have a viscosity ranging from a low of about 50 cP, about 75 cP, about 100, cP, about 150 cP, about 200 cP, or about 250 cP to a high of about 400 cP, about 500 cP, about 600 cP, about 700 cP, about 1,000 cP, about 1,250 cP, or about 1,500 cP, with suitable ranges including the combination of any two values. The viscosity of any one or more of the aldehyde based resins discussed and described herein can be determined using a Brookfield Viscometer at a temperature of about 25° C. For example, a Brookfield Viscometer, Model DV-II+, with a small sample adapter can be used. The small sample adapter can allow the sample to be cooled or heated by the chamber jacket to maintain the temperature of the sample surrounding the spindle at a temperature of about 25° C.

A suitable aqueous phenol-formaldehyde resole resin composition can be produced by reacting phenol and formaldehyde in water under an alkaline condition so as to yield a phenol-formaldehyde resole resin having a weight average molecular weight of about 1,000 to about 8,000 Daltons. For example, the weight average molecular weight of the phenol-formaldehyde resole resin can range from a low of about 1,000 Daltons, about 2,500 Daltons, or about 3,000 Daltons to a high of about 5,000 Daltons, about 6,000 Daltons, about 7,000 Daltons, with suitable ranges including the combination of any two values. In another example, the weight average molecular weight of the phenol-formaldehyde resole resin can be between about 1,500 Daltons and about 5,000 Daltons, about 1,800 Daltons to 4,500 Daltons, or about 2,000 Daltons to about 4,000 Daltons.

The weight average molecular weight of the phenol-formaldehyde resole resin can be determined by gel permeation chromatography (GPC). The GPC method can use tetrahydofuran as a solvent/diluent and a system of two mixed C chromatographic columns preceding a 500 Angstroms PLgel column, all available from Polymer Laboratories (now part of Varian, Inc.). The column arrangement is calibrated using a range of polystyrene standards. For determining the weight average molecular weight of a particular resin sample, the sample is injected along with polystyrene; such as having a molecular weight of about 250,000 Daltons, and toluene as an internal standard. A Model 759A Absorbance Detector from Applied Biosystems is used to monitor the column output and assist the molecular weight determination. The method of determining the molecular weight of a phenol-formaldehyde resin is well understood by those skilled in the art.

Any known method capable of producing a liquid phenol-formaldehyde resole resin can be used. Suitable methods for synthesizing a liquid phenol-formaldehyde resole resin composition can include both single step processes and multi-step or "programmed" processes (i.e., staged monomer/catalyst addition). While batch operations are the standard, continuous processes are also possible. Standard conditions, procedures and reactants for making an aqueous resole resin, well-known to those skilled in the art, can be used.

The phenol-formaldehyde resole resin can be produced by adding to a reactor containing phenol, an amount of formaldehyde sufficient to establish an initial formaldehyde to phenol molar ratio (F:P) in the range of about 0.6:1 to about 1.6:1. The formaldehyde can then be reacted, under an alkaline reaction condition, with the phenol to produce the phenol-formaldehyde resole resin. Following the initial reaction, an additional amount of formaldehyde can be added to the reaction mixture, sufficient to establish a cumulative formaldehyde to phenol (F:P) in the range of about 2:1 to about 2.65:1.

The reaction can be carried out in a liquid medium. Illustrative liquid mediums can include, but are not limited to, water, alcohols, glycols, acetonitrile, or any combination thereof. Suitable alcohols can include, but are not limited to, methanol, ethanol, propanol, butanol, or any combination thereof. Suitable glycols can include, but are not limited to, ethylene glycol, propylene glycol, or a combination thereof. As used herein, the terms "aqueous medium" and "aqueous liquid" can be or include water and/or mixtures composed of water and/or other water-miscible solvents. Illustrative water-miscible solvents can include, but are not limited to, alcohols, ethers, amines, other polar aprotic solvents, and the like.

The aqueous phenol-formaldehyde resole resin composition, as produced, can have a solids content of about 25 wt % to about 65 wt % solids, about 30 wt % to about 65 wt %, about 25 wt % to about 50 wt %, about 30 wt % to about 50 wt % solids, about 25 wt % to about 45 wt %, about 30 wt % to about 45 wt %, or about 35 wt % to about 45 wt % solids. As used herein, the solids content of the phenol-formaldehyde resole resin when combined with a liquid medium, as understood by those skilled in the art, can be measured by determining the weight loss upon heating a small sample, e.g., 1-5 grams, of the liquid phenol-formaldehyde resole resin to a suitable temperature, e.g., 105° C., and for a length of time sufficient to remove the liquid. By measuring the weight of the sample before and after heating, the percent solids in the sample can be directly calculated or otherwise estimated.

Conveniently, a batch process can be used to synthesize a suitable liquid phenol-formaldehyde resole resin composition by a single-stage alkaline condensation of phenol and formaldehyde under vacuum reflux at a temperature between about 50° C. to about 100° C., preferably above about 70° C., and more preferably above about 80° C.

The phenol-formaldehyde resole resin can be modified by the post addition of caustic and/or other additives such as urea and/or ammonia, which often are added to reduce the residual level of free, unreacted formaldehyde in the synthesized resin. Other additives can include, but are not limited to, dispersants, biocides, viscosity modifiers, pH adjusters, coupling agents, lubricants, defoamers, surfactants, and the like.

When preparing a liquid phenol-formaldehyde resole resin composition, an alkaline catalyst can be used to promote the reaction of formaldehyde with phenol. Illustrative alkaline catalysts can include, but are not limited to, alkali metal hydroxides, alkali metal carbonates, alkaline earth oxides, or any combination thereof. Illustrative alkali metal hydroxides can include, but are not limited to, sodium hydroxide, lithium hydroxide, potassium hydroxide, or any combination thereof. Generally sodium hydroxide is used based on its cost, availability, and suitability. Illustrative alkali metal carbonates can include, but are not limited to, sodium carbonate, lithium carbonate, potassium carbonate, or a combination thereof. Illustrative alkaline earth metal hydroxides can include, but are not limited to, magnesium hydroxide, calcium hydroxide, barium hydroxide, organic amines, or any combination thereof. Illustrative alkaline earth oxides can include, but are not limited to, calcium oxide, strontium oxide, barium oxide, or any combination thereof. In one or more embodiments, the catalyst can be used in a low amount, but in an effective amount to catalyze the reaction.

The liquid phenol-formaldehyde resole resin can also be prepared using staged addition processes, which are well known to those skilled in the art. When preparing the liquid phenol-formaldehyde resole resin in this way, formaldehyde can be added gradually to the phenol, and/or phenol can be added gradually to the formaldehyde and/or the alkaline catalyst can be added gradually to a mixture of formaldehyde and phenol to promote a controlled polymerization.

In any of these synthesis processes, the phenol-formaldehyde resole resin can be prepared using reactants that are commercially available in many forms such as solid, liquid, and/or gas. Formaldehyde is available as paraformaldehyde (a solid, polymerized formaldehyde) and more conveniently as formalin solutions (aqueous solutions of formaldehyde, sometimes with methanol, usually in 37 %, 44 %, or 50 % formaldehyde concentrations). Formaldehyde gas can also be used alone or in combination with sold and/or liquid forms of formaldehyde. In at least one specific embodiment, the formaldehyde can be partially or completely replaced with one or more other aldehyde compounds. Other aldehyde compounds can include, but are not limited to, acetaldehyde, propionaldehyde, butyraldehyde, furfuraldehyde, benzaldehyde, or any combination thereof. One or more other aldehyde compounds, such as glyoxal can also be used in place of or in combination with formaldehyde and/or other aldehyde compounds. In at least one embodiment, a formalin solution low in methanol can be used as the formaldehyde source.

Phenol used for making the phenol-formaldehyde resole resins can be replaced, partially or completely, with other phenolic compounds un-substituted at either the two ortho positions or at one ortho and the para position. These unsubstituted positions can facilitate the desired polymerization reaction(s). Any one, all, or none of the remaining carbon atoms of the phenol ring can be substituted in a conventional fashion. The nature of the substituents can vary widely, and it is only necessary that the substituent not interfere in the polymerization of the aldehyde with the phenol at the ortho and/or para positions. Substituted phenols which optionally can be employed in the formation of the liquid phenol-formaldehyde resole resin can include, but are not limited to, alkyl substituted phenols, aryl substituted phenols, cycloalkyl substituted phenols, alkenyl substituted phenols, alkoxy substituted phenols, aryloxy substituted phenols, and halogen substituted phenols, the foregoing substituents possibly containing from 1 to about 26, from 1 to about 20, from 1 to about 15, or from 1 to about 9 carbon atoms.

Specific examples of suitable phenolic compounds for replacing a portion or all of the phenol used in preparing the phenol-formaldehyde resin compositions can include, but are not limited to, bis-phenol A, bis-phenol F, o-cresol, m-cresol, p-cresol, 3,5-5 xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5 dicyclohexyl phenol, p-phenyl phenol, p-phenol, 3,5- dimethoxy phenol, 3,4,5 trimethoxy phenol, p-ethoxy phenol, p-butoxy phenol, 3-methyl-4-methoxy phenol, p-phenoxy phenol, naphthol, anthranol and substituted derivatives thereof.

The phenol-formaldehyde resole resin composition can have an alkalinity, i.e., contains a base, in the range of about 0.5 % to about 15 %, about 1 % to about 12 %, or about 2 % to 8 %, e.g., about 6 %, based on the weight of the liquid resole resin composition, when the base is sodium hydroxide. If a different base is used, the alkalinity content can be proportioned to be equivalent on a molar weight basis to the above noted range based on sodium hydroxide. For example, to attain the equivalent of an alkalinity of 6 % sodium hydroxide, i.e., 6 grams of sodium hydroxide in 100 grams of liquid resin, about 8.4 grams of potassium hydroxide in 100 grams of the resin solution would be required. As noted above, the base conveniently may be an alkali metal or alkaline earth metal compound such as a hydroxide, a carbonate, or an oxide.

Similar to phenol-formaldehyde resole resin, suitable urea-formaldehyde resins, melamine-formaldehyde, phenol-formaldehyde novolac resins, and resorcinol-formaldehyde resins can be prepared from melamine, phenol, and resorcinol monomers, respectively, and formaldehyde monomers or from melamine-formaldehyde, phenol-formaldehyde, and resorcinol-formaldehyde precondensates. Urea, melamine, and resorcinol reactants are commercially available in many forms and any form that can react with the other reactants and does not introduce extraneous moieties deleterious to the desired reaction and reaction product can be used in the preparation of the second copolymer.

Suitable forms of urea, if present in the aldehyde based resin, solid urea, such as prill and urea solutions, typically aqueous solutions, are can be used. Further, urea may be combined with another moiety, most typically formaldehyde and urea-formaldehyde adducts, often in aqueous solution. Any form of urea or urea in combination with formaldehyde can be used to make a urea-formaldehyde resin. Both urea prill and combined urea-formaldehyde products are preferred, such as UFC. These types of products can be as discussed and described in U.S. Pat. Nos. 5,362,842 and 5,389,716, for example.

Many suitable aldehyde based resins are commercially available. For example, suitable aldehyde based resins can include, but are not limited to, resins sold by Georgia-Pacific Chemicals LLC (e.g., LEAF™, RESI-STRAN®, RESTBOND®, WOODWELD®, RESORSABOND®, and RESTMIX®. These aldehyde based resins can be prepared in accordance with well known methods and contain reactive methylol groups which upon curing form methylene or ether linkages. Such methylol-containing adducts may include N,N'-dimethylol, dihydroxymethylolethylene; N,N'bis(methoxymethyl), N,N'-dimethylolpropylene; 5,5-dimethyl-N,N'dimethylolethylene; N,N'-dimethylolethylene; and the like.

Urea-formaldehyde resins can include from about 45 % to about 70 %, and preferably, from about 55 % to about 65 % non-volatiles, generally have a viscosity of about 50 centipoise ("cP") to about 1,200 cP, normally exhibit a pH of about 7 to about 9, preferably about 7.5 to about 8.5, and often have a free formaldehyde level of not more than about 3.0 %, and a water dilutability of about 1:1 to about 100:1, preferably about 5:1 and above.

Melamine, if present in the aldehyde based resin, can also be provided in many forms. For example, solid melamine, such as prill and/or melamine solutions can be used. Although melamine is specifically referred to, the melamine can be totally or partially replaced with other aminotriazine compounds. Other suitable aminotriazine compounds can include, but are not limited to, substituted melamines, cycloaliphatic guanamines, or combinations thereof. Substituted melamines include the alkyl melamines and aryl melamines that can be mono-, di-, or tri-substituted. In the alkyl substituted melamines, each alkyl group can contain 1-6 carbon atoms and, preferably 1-4 carbon atoms. Illustrative examples of the alkyl-substituted melamines can include, but are not limited to, monomethyl melamine, dimethyl melamine, trimethyl melamine, monoethyl melamine, and 1-methyl-3-propyl-5-butyl melamine. In the aryl-substituted melamines, each aryl group can contain 1-2 phenyl radicals and, preferably, one phenyl radical. Illustrative examples of aryl-substituted melamines can include, but are not limited to, monophenyl melamine and diphenyl melamine. Any of the cycloaliphatic guanamines can also be used. Suitable cycloaliphatic guanamines can include those having 15 or less carbon atoms. Illustrative cycloaliphatic guanamines can include, but are not limited to, tetrahydrobenzoguanamine, hexahydrobenzoguanamine, 3-methyl-tetrahydrobenzoguanamine, 3-methylhexahydrobenzoguanamine, 3,4-dimethyl-1,2,5,6-tetrahydrobenzoguanamine, and 3,4-dimethyl-hexahydrobenzoguanamine and mixtures thereof. Mixtures of aminotriazine compounds can include, for example, melamine and an alkyl-substituted melamine, such as dimethyl melamine, or melamine and a cycloaliphatic guanamine, such as tetrahydrobenzoguanamine.

The resorcinol component, if present in the aldehyde based resin, can be provided in a variety of forms. For example, the resorcinol component can be provided as a white/off-white solid or flake and/or the resorcinol component can be heated and supplied as a liquid. Any form of the resorcinol can be used with any form of the aldehyde component to make the resorcinol-aldehyde copolymer. The resorcinol component can be resorcinol itself (i.e., Benzene-1,3-diol). Suitable resorcinol compounds can also be described as substituted phenols. The solids component of a liquid resorcinol-formaldehyde copolymer can range from about 45 wt % to about 75 wt %. Liquid resorcinol-formaldehyde copolymers can have a viscosity that varies widely, e.g., from about 200 cP to about 20,000 cP. Liquid resorcinol copolymers typically have a dark amber color.

As used herein, the term "filler" refers to materials that can be added to the aldehyde based resin and/or materials that can be mixed with discrete aldehyde based resin particulates that occupy volume but do not contribute or do not substantially contribute to bonding properties of the binder composition. Suitable fillers can be or include, but are not limited to, ground, crushed, pulverized, other otherwise reduced into particulate form nut shells, seed shells, fruit pits, animal bones, milwhite, clay, or any combination thereof. Other suitable fillers can include, but are not limited to, inorganic oxides, e.g., silica and/or alumina, glass spheres or particulates, and the like.

Illustrative nut shells can include, but are not limited to, walnut shells, pecan shells, almond shells, ivory nut shells, brazil nut shells, ground nut (peanut) shells, pine nut shells, cashew nut shells, sunflower seed shells, Filbert nut (hazel nut) shells, macadamia nut shells, soy nut shells, pistachio nut shells, pumpkin seed shells, or the like, or any combination thereof. Illustrative seed shells (including fruit pits), can include, but are not limited to, the seed shells of fruit, e.g., plum, peach, cherry, apricot, olive, mango, jackfruit, guava, custard apples, pomegranates, and watermelon, ground or crushed seed shells of other plants such as maize (e.g., corn cobs or corn kernels), wheat, rice, jowar, or the like, or any combination thereof. More particular examples of suitable fillers can include, but are not limited to, wheat shell, corn husk, peanut shell, or any combination thereof. For example, the nut shells and/or seed shells can be ground or powdered, e.g., flour form. In one example, suitable flours derived from nut shells can include, but are not limited to, walnut shell flour, pecan shell flour, almond shell flour, or any combination thereof. Illustrative flour derived from the seed shells of fruits can include, but are not limited to, apricot pit shell flour, peach pit shell flour, prune pit shell flour, or any combination thereof.

As used herein, the term "extender" refers to materials that can be added to the aldehyde based resin and/or materials that can be mixed with discrete aldehyde based resin particulates that occupy volume and also contribute to bonding properties of the binder composition. One example of a suitable extender can be a material that includes one or more proteins. The protein can contribute to the crosslinking of the binder composition during at least partial cure thereof. Suitable extenders can include, but are not limited to, corn flour, soy flour, wheat flour, spray dried blood, or any combination thereof.

The soy flour can be a raw soy protein and/or a soy protein modified as discussed and described in U.S. Pat. No. 6,497,760. Raw soy protein can be in the form of ground whole beans (including the hulls, oil, protein, minerals, etc.), a meal (extracted or partially extracted), a flour (i.e., generally containing less than about 1.5 % oil and about 30-35 % carbohydrate), or an isolate (i.e., a substantially pure protein flour containing less than about 0.5 % oil and less than about 5 % carbohydrate). Suitable soy protein can be derived from any source of soy protein such as soybean concentrate or soybean meal. Protein-rich soybean-derived flours, such as soy protein isolate, protein concentrate and ordinary defatted soy flour, which contain in the range of about 20-95 % protein, can be used. Of these, ordinary soy flour is the most abundant and cost-effective. The source of soy protein (soy flour) can be essentially free of functional urease. Information on soy protein can be found in, for example, Kirk-Othmer, Encyclopedia of Chemical Technology, Fourth Edition, Volume 22, pp. 591-619 (1997). Modified soy protein can be modified with either of two classes of modifiers. The first class of modifiers can include saturated and unsaturated alkali metal $C_8$-$C_{22}$ sulfate and sulfonate salts. Two preferred modifiers in this class are sodium dodecyl sulfate and sodium dodecylbenzene sulfonate. The second class of modifiers includes compounds having the formula $R_2NC(=X)NR_2$, where each R is individually selected from the group consisting of H and $C_1$-$C_4$ saturated and unsaturated groups, and X is selected from the group consisting of O, NH, and S. The $C_1$-$C_4$ saturated groups refer to alkyl groups (both straight and branched chain) and the unsaturated groups refer to alkenyl and alkynyl groups (both straight and branched chain). Illustrative modifiers in the second group can include, but are not limited to, urea and guanidine hydrochloride. Other suitable extenders and preparation thereof can include, but are not limited to, those discussed and described in U.S. Pat. Nos. 2,507,465; 2,492,510; 2,781,286; 3,285,805; 3,957,703; 4,070,314; 4,244,846; and 4,778,530.

The fillers and/or extenders can have an average particle size ranging from about 0.1 µm to about 100 µm. For example, the average particle size of the fillers and/or extenders can range from a low of about 1 µm, about 3, about 5 µm, about 8 µm, or about 10 µm to a high of about 30 µm, about 40 µm, about 50 µm, or about 60 µm, with suitable ranges including the combination of any two values. In another example, the average particle size of the fillers and/or extenders can range from about 7 µm to about 30 µm, about 10 to about 30, about 20 µm to about 35 µm, about 0.1 µm to about 10 µm, about 5 µm to about 45 µm, about 15 to about 35, or about 10 µm to about 50 µm.

If the binder composition includes one or more fillers and one or more extenders, the amount of the filler(s) and extender(s), relative to one another, can widely vary. For example, if the binder composition includes both the filler and extender, the amount of the filler in the binder composition can range from about 0.1 wt % to about 99.9 wt %, based on the combined weight of the filler(s) and the extender(s). In another example, in a binder composition containing both a filler and an extender, the binder composition can have a concentration of the filler ranging from a low of about 0.5 wt %, about 1 wt %, about 5 wt %, about 10 wt %, or about 20 wt % to a high of about 30 wt %, about 40 wt %, about 50 wt %, about 60 wt %, about 70 wt %, about 80 wt %, about 90 wt %, or about 95 wt %, based on the combined weight of the filler(s) and extender(s), with suitable ranges including the combination of any two values.

The particulate binder composition, e.g., the spray dried binder composition and/or a mixture of the discrete aldehyde resin particulates and at least one of discreet filler and extender particulates, can be used in the preparation of a variety of lignocellulose composite products. Methods for using the particulate binder compositions for making wood composites are well-known to those skilled in the art. Heat and pressure can be applied to a mat of wood pieces, e.g., wood wafers and/or oriented strands of wood, at least partially coated with the powdered resin in order to cure the resin and form a composite product. Conventional temperatures, time periods, pressures, and quantity of particulate binder composition can be used.

For example, the particulate binder composition can be applied to a plurality of lignocellulose substrates to form a binder composition/substrate mixture or "furnish." The lignocellulose substrates can be formed into a desired shape before and/or after application of the particulate binder composition, and the particulate binder composition can be at least partially cured to produce a composite product. At least partially curing the particulate binder composition can include applying heat and/or pressure thereto. In another example, the particulate binder composition can be applied to a plurality of lignocellulose or wood particles and at least partially cured to produce cellulose based or wood based products or composites. In another example, the particulate binder composition can be applied to wood or other lignocellulose based veneers and/or substrates and the binder composition can be at least partially cured to adhere the veneer(s) and/or substrate(s) to one another. In another example, the particulate binder composition can be applied to a plurality of randomly oriented or non-oriented lignocellulose substrates, e.g., fibers, chips, flakes, strands, or the like, or any combination thereof, formed into a mat or board shape, and then at least partially cured to produce a lignocellulose mat or board. In another example, the particulate binder composition can be applied to a plurality of oriented lignocellulose fibers, chips, flakes, strands, or the like, or any combination thereof, formed into a mat or board shape, and then at least partially cured to produce a lignocellulose mat or board. For example, the mat or board shape can include two or more layers of the lignocellulose substrates with each layer have substantially aligned substrates and with the lignocellulose substrates in each alternating of adjacent layer oriented perpendicularly to the one another.

The amount of the particulate binder composition applied to the lignocellulose substrates can range from a low of about 1 wt %, about 2 wt %, about 3 wt %, about 4 wt %, about 5 wt % or about 6 wt % to a high of about 10 wt %, about 12 wt %, about 15 wt %, or about 20 wt %, based on dry a weight of the lignocellulose substrates, with suitable ranges including the combination of any two values. For example, a composite product of the lignocellulose substrates can contain from about 5 wt % to about 15 wt %, about 8 wt % to about 14 wt %, about 10 wt % to about 12 wt %, or about 7 wt % to about 10 wt % binder composition, based on a dry weight of the lignocellulose substrates. In another example, a composite product of the lignocellulose substrates can contain from about 1 wt % to about 4 wt %, about 1.5 wt % to about 5 wt %, about 2 wt % to about 4 wt %, about 2 wt % to about 6 wt %, or about 0.5 wt % to about 5.5 wt % binder composition, based on a dry weight of the lignocellulose substrates.

As used herein, the terms "curing," "cured," and similar terms are intended to embrace the structural and/or morphological change that occurs in a the binder composition, such as by covalent chemical reaction (crosslinking), ionic interaction or clustering, improved adhesion to the substrate, phase transformation or inversion, and/or hydrogen bonding when the binder composition is at least partially cured to cause the properties of a flexible, porous substrate, such as a mat or blanket of fibers, especially glass fibers, and/or a rigid or semi-rigid substrate, such as a wood or other cellulose containing board or sheet, to which an effective amount of the binder composition has been applied, to be altered.

The lignocellulose substrate (material that includes both cellulose and lignin) can include, but is not limited to, straw, hemp, sisal, cotton stalk, wheat, bamboo, sabai grass, rice straw, banana leaves, paper mulberry (i.e., bast fiber), abaca leaves, pineapple leaves, esparto grass leaves, fibers from the genus *Hesperaloe* in the family Agavaceae jute, salt water reeds, palm fronds, flax, ground nut shells, hardwoods, softwoods, recycled fiberboards such as high density fiberboard, medium density fiberboard, low density fiberboard, oriented strand board, particleboard, animal fibers (e.g., wool, hair), recycled paper products (e.g., newspapers, cardboard, cereal boxes, and magazines), or any combination thereof. Suitable woods can include softwoods and/or hardwoods. Illustrative types of wood can include, but are not limited to, alder, ash, aspen, basswood, beech, birch, cedar, cherry, cottonwood, cypress, elm, fir, gum, hackberry, hickory, maple, oak, pecan, pine, poplar, redwood, sassafras, spruce, sycamore, walnut, and willow. The lignocellulose substrates can have a moisture concentration ranging from about 1 wt % to about 25 wt %. For example, the lignocellulose substrates can have a moisture concentration ranging from a low of about 2 wt %, about 3 wt %, about 4 wt %, or about 5 wt % to a high of about 10 wt %, about 13 wt %, about 16 wt %, or about 19 wt %, or about 22 wt %, with suitable ranges including the combination of any two values.

The starting material, from which the lignocellulose substrates can be derived from, can be reduced to the appropriate size or dimensions by various processes such as hogging, grinding, hammer milling, tearing, shredding, and/or flaking. Suitable forms of the lignocellulose substrates can include, but are not limited to, chips, fibers, shavings, sawdust or dust, or the like. The lignocellulose substrates can have a length ranging from a low of about 0.05 mm, about 0.1 mm, about 0.2 mm to a high of about 1 mm, about 5 mm, about 10 mm, about 20 mm, about 30 mm, about 40 mm, about 50 mm, or about 100 mm, with suitable ranges including the combination of any two values. The starting material, from which the lignocellulose substrates can be derived from, can also be formed into the appropriate size or dimensions by skiving, cutting, slicing, sawing, or otherwise removing a thin layer or sheet from a source of lignocellulose material, e.g., a wood log, to produce a veneer or layer.

During production of the lignocellulose composite products, the pressure applied to the furnish can depend, at least in part, on the particular composite product. For example, the amount of pressure applied in a particleboard production process can range from about 1 MPa to about 5 MPa or from about 2 MPa to about 4 MPa. In another example, the amount of pressure applied in a MDF production process can range from about 2 MPa to about 7 MPa or from about 3 MPa to about 6 MPa. The temperature the product can be heated to produce an at least partially cured product can range from a low of about 100° C., about 125° C., about 150° C., or about 170° C. to a high of about 180° C., about 200° C., about 220° C., or about 250° C., with suitable ranges including the combination of any two values. The length of time the pressure can be applied can range from a low of about 15 second, about 30 seconds, about 1 minute, about 3 minutes, about 5 minutes, or about 7 minutes to a high of about 10 minutes, about 15 minutes, about 20 minutes, or about 30 minutes, with suitable ranges including the combination of any two values. For example, the length of time the pressure and/or heat can be applied to the furnish can range from about 30 seconds to about 2 minutes, about 1 minute to about 3 minutes, about 1.5 minutes to about 4 minutes, or about 45 seconds to about 3.5 minutes. The length of time the pressure can be applied can depend, at least in part, on the particular product and/or the particular dimensions, e.g., thickness of the product.

Wood composite products that can be made using such particulate binder compositions can include, but are not limited to, oriented strand board (OSB), oriented strand lumber (OSL), medium density fiberboard (MDF), high density fiberboard (HDF), PARALLAM®, plywood, hardboard, waferboard, chipboard, particleboard, flakeboard, and the like. Other composite products can be produced from two or more veneer. For example, composite products produced with veneer, in finished form, can include those products typically referred to as laminated veneer lumber ("LVL"), laminated veneer boards ("LVB"), and/or plywood.

The particulate binder compositions discussed and described herein can be reconstituted with water or other liquid medium to form a liquid adhesive for making these and other wood composite products. For example, the particulate binder compositions can be reconstituted with a liquid medium to have a solids content ranging from a low of about 5 wt %, about 10 wt %, about 15 wt %, or about 20 wt % to a high of about 40 wt %, about 50 wt %, about 60 wt %, about 70 wt %, or about 80 wt %, based on the combined weight of the aldehyde based resin, the filler and/or extender, and the liquid medium, with suitable ranges including the combination of any two values.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

An aqueous phenol-formaldehyde resole resin was used as the aldehyde based resin for all examples. The aqueous phenol-formaldehyde resole resin had about 44.5 wt % solids, a pH of about 10.0, a viscosity of about 160 cP at 25° C., an alkalinity of about 3.5 %, and a molar ratio of formaldehyde to phenol of about 2.2:1. Comparative examples CEx. 1 and CEx. 2 both used the aqueous phenol-formaldehyde resole resin.

For Examples 1 and 2, ground peanut shells were added to the aqueous phenol-formaldehyde resin as a filler in an amount of about 5 wt % and 15 wt %, respectively, based on the solids weight of the phenol-formaldehyde resin. For Example 3, ground peanut shells in an amount of about 10 wt % and corn flour in an amount of about 5 wt %, based on the solids weight of the phenol-formaldehyde resin, were added to the aqueous phenol-formaldehyde resin as filler and extender, respectively. For example 4, about 5 wt % corn flour, based on the solids weight of the phenol-formaldehyde resin, was added to the aqueous phenol-formaldehyde resin as an extender. The ground peanut shells used in Examples 1-3 had an average particle size of about 25.2 μm. The corn flour used in Examples 3 and 4 had an average particle size of about 28.6 μm, a protein concentration of about 8.5 wt % to about 12.5 wt %, and a moisture concentration of about 7.5 wt % to about 11.5 wt %.

About 8,000 grams of the aqueous phenol-formaldehyde resole resin (CEx. 1 and 2) and about 4,000 grams of the aqueous phenol-formaldehyde resole resin combined with the appropriate amount of filler and/or extender in Examples 1-4 were all spray-dried. The aqueous mixture for each example had a solids concentration of about 34 wt %. Each aqueous mixture was agitated using a high shear mixer that formed a vortex when mixing, thus allowing air to be whipped or blended into the mixture to produce an aerated mixture. The aerated mixture was mixed at room temperature for about for about 30 seconds, after which the aerated mixture was immediately introduced to a spray-drying apparatus. The spray drying apparatus was a MOBILE MINOR® spray dryer from Niro, Inc. The inlet temperature of the dryer was set at about 160° C. and the feed rate of the aerated mixtures were adjusted to yield an outlet temperature of about 80° C. to about 85° C. The atomizer speed was set at 5 on the spray dryer's scale of 0 to 10.

The average particle size (μm), packed bulk density (g/cm$^3$), moisture content (wt % based on total weight of the spray-dried resin), stroke time (seconds), and fusion diameter (mm) of the spray dried resins for comparative example CEx. 1 and Examples 1-4 are shown in Table 1 below. The average particle sizes of the powdered resins was determined according to the Structural Board Association (SBA) GPAM2771.3 test procedure. The packed bulk density of the powdered resins was determined according to the Structural Board Association (SBA) GPAM2771.4 test procedure. The moisture content of the powdered resins was determined according to the SBA GPAM2771.5 test procedure. The stroke time of the powdered resins was determined according to the SBA GPAM2771.1 test procedure. The fusion diameter of the powdered resins was determined according to the SBA GPAM2771.2 test procedure. The packed bulk density, stroke cure, and moisture content for five samples were measured and the average of those five tests is shown in Table 1. The fusion diameter for two samples was measured and the average of those two tests is shown in Table 1.

The properties of the spray dried resins (CEx. 1 and CEx. 2) and binder compositions (Ex. 1-4) for the examples are shown below in Table 1.

TABLE 1

| Example | Filler | Extender | Average Size (μm) | PBD (g/cm3) | MC wt % | SC (sec.) | FD (mm) |
|---|---|---|---|---|---|---|---|
| CEx. 1 | 0 | 0 | 19.2 | 0.527 | 3.7 | 12 | 28 |
| CEx. 2 | 0 | 0 | 19.2 | 0.527 | 3.7 | 12 | 28 |
| Ex. 1 | 5 | 0 | 17.6 | 0.532 | 3.8 | 12 | 28 |
| Ex. 2 | 15 | 0 | 15.1 | 0.53 | 3.7 | 12 | 28 |
| Ex. 3 | 10 | 5 | 16.8 | 0.535 | 3.5 | 12 | 28 |
| Ex. 4 | 0 | 5 | 18.9 | 0.53 | 3.6 | 12 | 28 |

Six sets of panels were made, with the six spray-dried resins and binder compositions discussed above, namely, comparative examples CEx. 1 and 2 and inventive examples (Ex. 1-4). Each panel was a single layer, non-oriented, panel. The lignocellulose substrates used to produce all panels was Southern Yellow Pine having an average flake size of about 3 inches and having a moisture concentration of about 5 wt %. The difference between comparative examples CEx. 1 and CEx. 2 was the amount of the spray dried resin used to produce the composite products. Comparative example CEx. 1 used 100 % loading while comparative example CEx. 2 used 95 % loading. For the purposes of these examples, 100 % percent loading or ( % loading) was 1.8 wt %, based on the weight of the dry lignocellulose substrates. As such, the amount of the spray dried resin used in comparative example CEx. 2 was about 1.71 wt %, based on the weight of the dry lignocellulose substrates. Examples 1-4 all used 100 % loading, i.e., the mixture of the lignocellulose substrates and particulate binder composition had a concentration of the binder composition of about 1.8 wt %. Slack wax in an amount of about 1 wt %, based on the weight of the lignocellulose substrates was also added. The press used to form the panels was a Wabash Metals Hydraulic Press having press platens of 24 inches×24 inches. The press heated the panels to a temperature of about 210° C.+/−5.5° C. when the panels were pressed.

Each panel was pressed for a time of about 200 (series of examples labeled with an "A"), 220 (series of examples labeled with a "B"), or 240 seconds (series of examples labeled with a "C"). For each example, two panels for each of the 200 and 220 second press time were made and 4 panels for the 240 second press time were made. The formed panels were about 0.4375 inches thick×18 inches×18 inches and had a target density of 43 pounds per cubic foot (pcf). The internal bond strength for each example was measured and determined according to the test procedure provided for in ASTM D1037-06a. The internal bond strength of 144 samples for each example was tested, with the average value for each example shown in Table 2 below. Standard statistical methods were used to derive the data shown in Table 2.

TABLE 2

Means Comparison

| Example | Press Time, sec | IB, psi Mean | IB, psi Std. Err. | IB, psi −95% | IB, psi +95% |
|---|---|---|---|---|---|
| CEx. 1A | 200 | 65.84 | 2.53 | 60.75 | 70.93 |
| CEx. 2A | 200 | 32.77 | 3.8 | 25.13 | 40.41 |
| Ex. 1A | 200 | 54.83 | 2.2 | 50.4 | 59.26 |
| Ex. 2A | 200 | 60.06 | 2.68 | 54.68 | 65.44 |
| Ex. 3A | 200 | 53.8 | 2.62 | 48.53 | 59.06 |
| Ex. 4A | 200 | 57.42 | 3.36 | 50.66 | 64.17 |
| CEx. 1B | 220 | 73.69 | 2.03 | 69.6 | 77.77 |
| CEx. 2B | 220 | 42.62 | 3.91 | 34.76 | 50.49 |
| Ex. 1B | 220 | 64.89 | 2.83 | 59.19 | 70.58 |
| Ex. 2B | 220 | 62.9 | 2.51 | 57.84 | 67.95 |
| Ex. 3B | 220 | 62.19 | 2.63 | 56.89 | 67.49 |
| Ex. 4B | 220 | 79.61 | 2.39 | 74.8 | 84.42 |
| CEx. 1C | 240 | 73.9 | 1.84 | 70.2 | 77.59 |
| CEx. 2C | 240 | 67.14 | 3.17 | 60.76 | 73.52 |
| Ex. 1C | 240 | 69.93 | 2.7 | 64.51 | 75.36 |
| Ex. 2C | 240 | 74.06 | 2.82 | 68.39 | 79.73 |
| Ex. 3C | 240 | 69.15 | 2.59 | 63.94 | 74.37 |
| Ex. 4C | 240 | 71.08 | 2.78 | 65.48 | 76.68 |

The results of the internal bond strengths for the panels of CEx, 1 and 2 and Ex. 1-4 were compared in more detail (Tables 3-5) by using Bayesian methods. Table 3 below, shows the Comparison of Means for the Internal Bond at the 200 second press time.

TABLE 3

| Example | Mean Diff | SD | Std. Err. | 2.50% | Mean | 97.50% |
|---|---|---|---|---|---|---|
| CEx. 1A | 0 | 2.537 | 0.02534 | 60.89 | 65.83 | 70.88 |
| CEx. 2A | −33.12 | 3.782 | 0.03219 | 25.21 | 32.71 | 40.19 |
| Ex. 1A | −11.01 | 2.194 | 0.02345 | 50.5 | 54.82 | 59.18 |
| Ex. 2A | −5.78 | 2.669 | 0.02653 | 54.83 | 60.05 | 65.33 |
| Ex. 3A | −12.03 | 2.604 | 0.02438 | 48.66 | 53.8 | 58.86 |
| Ex. 4A | −8.44 | 3.319 | 0.0357 | 50.94 | 57.39 | 63.94 |

Table 4 below, shows the Comparison of Means for the Internal Bond at the 220 second press time.

TABLE 4

| Example | Mean Diff | SD | Std. Err. | 2.50% | Mean | 97.50% |
|---|---|---|---|---|---|---|
| CEx. 1B | 0 | 2.037 | 0.02035 | 69.71 | 73.68 | 77.73 |
| CEx. 2B | −31.12 | 3.896 | 0.03316 | 34.83 | 42.56 | 50.27 |
| Ex. 1B | −8.81 | 2.818 | 0.03013 | 59.33 | 64.87 | 70.47 |
| Ex. 2B | −10.79 | 2.506 | 0.02491 | 57.99 | 62.89 | 67.85 |
| Ex. 3B | −11.48 | 2.62 | 0.02453 | 57.02 | 62.2 | 67.29 |
| Ex. 4B | 5.91 | 2.365 | 0.02544 | 74.99 | 79.59 | 84.26 |

Table 3 below, shows the Comparison of Means for the Internal Bond at the 240 second press time.

TABLE 5

| Example | Mean Diff | SD | Std. Err. | 2.50% | Mean | 97.50% |
|---|---|---|---|---|---|---|
| CEx. 1C | 0 | 1.844 | 0.01843 | 70.3 | 73.89 | 77.56 |
| CEx. 2C | −6.8 | 3.159 | 0.02689 | 60.82 | 67.09 | 73.34 |
| Ex. 1C | −3.97 | 2.685 | 0.02871 | 64.64 | 69.92 | 75.25 |
| Ex. 2C | 0.16 | 2.814 | 0.02796 | 68.55 | 74.05 | 79.62 |
| Ex. 3C | −4.73 | 2.579 | 0.02414 | 64.07 | 69.16 | 74.17 |
| Ex. 4C | −2.83 | 2.752 | 0.0296 | 65.71 | 71.06 | 76.49 |

As shown in Tables 2, 3, 4, and/or 5, the internal bond strength for Ex. 1A-4A all trended slightly lower than comparative example CEx. 1A. The comparative example CEx. 2A that was at only 95% loading yielded significantly lower internal bond strength as compared to comparative example CEx. 1A. The internal bond strength for Ex. 1B-3B all trended slightly lower than comparative example CEx. 1A. The internal bond strength for Ex. 4B, however, was slightly inside the significances threshold and with a trend above that of the comparative example CEx. 1B. The comparative example CEx. 2B again yielded significantly lower internal bond strength as compared to comparative example CEx. 1B. The internal bond strength Ex. 1C, 3C, and 4C all trended slightly lower than comparative example CEx. 1C. The internal bond strength for Ex. 2C, however, was slightly inside the significances threshold and with a trend above that of the comparative example CEx. 1C. The comparative example CEx. 2C again yielded significantly lower internal bond strength as compared to comparative example CEx. 1C. The data in Tables 2-5, shows that at the 240 second press time, the binder compositions of Ex. 1-4 are all statistically equivalent to the comparative example CEx. 1.

Embodiments of the present invention further relate to any one or more of the following paragraphs:

1. A binder composition for producing composite lignocellulose products, comprising: an aldehyde based resin; and a filler, an extender, or a combination thereof, wherein the binder composition is in the form of particulates, and wherein the particulates each comprises the filler, the extender, or the combination thereof and the aldehyde based resin.

2. A method for producing a binder composition, comprising: combining a filler, an extender, or a both with an aldehyde based resin in the presence of a liquid medium to produce a mixture; and removing at least a portion of the liquid medium to produce a particulate binder composition, wherein each particulate comprises the filler, the extender, or the combination thereof and the aldehyde based resin.

3. A method for producing a binder composition, comprising: spray-drying an aerated liquid mixture comprising a filler, an extender, or a combination thereof and an aldehyde based resin to produce a spray-dried binder composition, wherein the spray-dried binder composition is in the form of particulates, and wherein each particulate comprises the filler, the extender, or the combination thereof and the aldehyde based resin.

4. A composite product, comprising: a plurality of lignocellulose substrates and an at least partially cured binder composition, wherein the binder composition, prior to at least partial curing, comprises: an aldehyde based resin; and a filler, an extender, or a combination thereof, wherein the binder composition is in the form of particulates, and wherein each particulate comprises the filler, the extender, or the combination thereof and the aldehyde based resin.

5. A method for producing a particulate binder composition, comprising: synthesizing a liquid phenol-formaldehyde resole resin; combining a filler, an extender, or a both with the liquid phenol-formaldehyde resole resin in an amount sufficient to produce a mixture containing about 1 wt% to about 25 wt% of the filler, the extender, or both, based on the combined weight of the liquid phenol-formaldehyde resole resin solids and the filler, the extender, or both; agitating the mixture to produce an aerated mixture; and spray-drying the aerated mixture to produce a spray-dried particulate binder composition, wherein each particulate comprises the filler, the extender, or the combination thereof and the aldehyde based resin.

6. A method for making a composite product, comprising: contacting a plurality of lignocellulose substrates with a particulate binder composition, the particulate binder composition comprising: an aldehyde based resin; and a filler, an extender, or a combination thereof, wherein each particulate comprises the filler, the extender, or the combination thereof and the aldehyde based resin; and at least partially curing the binder composition to produce a composite product.

7. The binder composition, method, or composite product according to any one of paragraphs 1 to 6, wherein the particulates have an average size ranging from about 1 μm to about 150 μm.

8. The binder composition, method, or composite product according to any one of paragraphs 1 to 7, wherein the particulates have a packed bulk density ranging from about 0.15 g/cm$^3$ to about 0.85 g/cm$^3$.

9. The binder composition, method, or composite product according to any one of paragraphs 1 to 8, wherein the particulates have a liquid concentration of less than about 10 wt %, based on a total weight of the particulates.

10. The binder composition, method, or composite product according to any one of paragraphs 1 to 9, wherein the aldehyde based resin comprises a urea-aldehyde resin, a melamine-aldehyde resin, a phenol-aldehyde resin, a resorcinol-aldehyde resin, a phenol-resorcinol-aldehyde resin, a melamine-urea-aldehyde resin, a phenol-urea-aldehyde resin, or any combination thereof.

11. The binder composition, method, or composite product according to any one of paragraphs 1 to 10, wherein the aldehyde based resin comprises phenol-formaldehyde resole resin.

12. The binder composition, method, or composite product according to paragraph 11, wherein the phenol-formaldehyde resole resin has a formaldehyde to phenol molar ratio ranging from about 2:1 to about 2.65:1.

13. The binder composition, method, or composite product according to paragraph 11 or 12, wherein the liquid phenol-formaldehyde resole resin has a weight average molecular weight ranging from about 1,000 Daltons to about 8,000 Daltons.

14. The binder composition, method, or composite product according to any one of paragraphs 1 to 13, wherein the extender is present and comprises corn flour, soy protein powder, wheat flour, spray dried blood, or any combination thereof.

15. The binder composition, method, or composite product according to paragraph 14, wherein the soy flour comprises soy protein modified with compounds having the formula $R_2NC(=X)NR_2$, wherein each R is individually selected from the group consisting of H and $C_1$-$C_4$ saturated and unsaturated groups, and X is selected from the group consisting of O, NH, and S, soy protein modified with saturated and unsaturated alkali metal $C_8$-$C_{22}$ sulfate and sulfonate salts, or any combination thereof.

16. The binder composition, method, or composite product according to any one of paragraphs 1 to 15, wherein the filler is present and comprises nut shells, seed shells, fruit pits, animal bones, milwhite, clay, or any combination thereof.

17. The binder composition, method, or composite product according to any one of paragraphs 1 to 16, wherein the filler is present and comprises wheat shell, corn husk, pecan shell, peanut shell, or any combination thereof.

18. The binder composition, method, or composite product according to any one of paragraphs 1 to 18, wherein the filler, the extender, or the combination thereof is present in an amount ranging from about 1 wt % to about 25 wt %, based on a combined weight of the filler, the extender, or both and the aldehyde based resin.

19. The composite product according to paragraph 4, wherein an amount of the aldehyde based resin in the composite product is about 1 wt % to about 25 wt % less as compared to a comparative composite product produced with a comparative particulate binder composition having the same aldehyde based resin but no filler or extender.

20. The composite product according to paragraph 19, wherein an internal bond strength of the composite product is equal to or greater than an internal bond strength of the comparative composite product.

21. A binder composition for producing composite lignocellulose products, comprising a mixture of a first plurality of particulates comprising one or more aldehyde based resins and a second plurality of particulates comprising one or more fillers, one or more extenders, or a combination thereof.

22. A method for producing a binder composition, comprising: removing at least a portion of a liquid medium combined with an aldehyde based resin to produce a first plurality of particulates; and combining the first plurality of particulates with a second plurality of particulates to produce a binder composition, wherein the second plurality of particulates comprises one or more fillers, one or more extenders, or a combination thereof.

23. A method for producing a binder composition, comprising: spray-drying an aerated liquid mixture comprising one or more aldehyde based resins to produce a first plurality of particulates; and combining the first plurality of particulates with a second plurality of particulates to produce a binder composition, wherein the second plurality of particulates comprises one or more fillers, one or more extenders, or a combination thereof.

24. A composite product, comprising: a plurality of lignocellulose substrates and an at least partially cured binder composition, wherein the binder composition, prior to at least partial curing, comprises a mixture of a first plurality of particulates comprising one or more aldehyde based resins and a second plurality of particulates comprising one or more fillers, one or more extenders, or a combination thereof.

25. A method for making a composite product, comprising: contacting a plurality of lignocellulose substrates with a particulate binder composition, the particulate binder composition comprising a mixture of a first plurality of particulates comprising one or more aldehyde based resins and a second plurality of particulates comprising one or more fillers, one or more extenders, or a combination thereof; and at least partially curing the binder composition to produce a composite product.

26. The binder composition, method, or composite product according to any one of paragraphs 21 to 25, wherein the first plurality of particulates and the second plurality of particulates each have an average size ranging from about 1 μm to about 150 μm.

27. The binder composition, method, or composite product according to any one of paragraphs 21 to 25, wherein the mixture of the first plurality of particulates and the second plurality of particulates has a packed bulk density ranging from about 0.15 g/cm$^3$ to about 0.85 g/cm$^3$.

28. The binder composition, method, or composite product according to any one of paragraphs 21 to 25, wherein the first plurality of particulates has a liquid concentration of less than about 10 wt %, based on a total weight of the first plurality of particulates.

29. The binder composition, method, or composite product according to any one of paragraphs 21 to 25, wherein the second plurality of particulates has a liquid concentration of less than about 10 wt %, based on a total weight of the second plurality of particulates.

30. The binder composition, method, or composite product according to any one of paragraphs 21 to 25, wherein the aldehyde based resin comprises a urea-aldehyde resin, a melamine-aldehyde resin, a phenol-aldehyde resin, a resorcinol-aldehyde resin, a phenol-resorcinol-aldehyde resin, a melamine-urea-aldehyde resin, a phenol-urea-aldehyde resin, or any combination thereof.

31. The binder composition, method, or composite product according to paragraph 30, wherein the aldehyde based resin comprises phenol-formaldehyde resole resin.

32. The binder composition, method, or composite product according to paragraph 30, wherein the phenol-formaldehyde resole resin has a formaldehyde to phenol molar ratio ranging from about 2:1 to about 2.65:1.

33. The binder composition, method, or composite product according to paragraph 30, wherein the liquid phenol-formaldehyde resole resin has a weight average molecular weight ranging from about 1,000 Daltons to about 8,000 Daltons.

34. The binder composition, method, or composite product according to any one of paragraphs 21 to 25, wherein the one or more extenders is present and comprises corn flour, soy protein powder, wheat flour, spray dried blood, or any combination thereof.

35. The binder composition, method, or composite product according to paragraph 34, wherein the soy flour comprises soy protein modified with compounds having the formula $R_2NC(=X)NR_2$, wherein each R is individually selected from the group consisting of H and $C_1$-$C_4$ saturated and unsaturated groups, and X is selected from the group consisting of O, NH, and S, soy protein modified with saturated and unsaturated alkali metal $C_8$-$C_{22}$ sulfate and sulfonate salts, or any combination thereof.

36. The binder composition, method, or composite product according to any one of paragraphs 21 to 25, wherein the one or more fillers is present and comprises nut shells, seed shells, fruit pits, animal bones, milwhite, clay, or any combination thereof.

37. The binder composition, method, or composite product according to any one of paragraphs 21 to 25, wherein the one or more fillers is present and comprises wheat shell, corn husk, pecan shell, peanut shell, or any combination thereof.

38. The binder composition, method, or composite product according to any one of paragraphs 21 to 25, wherein the one or more fillers, the one or more extenders, or the combination thereof is present in an amount ranging from about 1 wt % to about 25 wt %, based on a combined weight of the first plurality of particulates and the second plurality of particulates.

39. The composite product according to paragraphs 24 or 25, wherein an amount of the aldehyde based resin in the composite product is about 1 wt % to about 25 wt % less as compared to a comparative composite product produced with a comparative particulate binder composition having the same aldehyde based resin but no filler or extender.

40. The composite product according to paragraph 39, wherein an internal bond strength of the composite product is equal to or greater than an internal bond strength of the comparative composite product.

41. A method for producing a particulate binder composition, comprising: synthesizing a liquid phenol-formaldehyde resole resin; agitating the liquid phenol-formaldehyde resin to produce an aerated phenol-formaldehyde resole resin; and spray-drying the aerated phenol-formaldehyde resole resin to produce a spray-dried particulate phenol-formaldehyde resole resin; and combining the spray-dried particulate phenol-formaldehyde resole resin with one or more fillers, one or more extenders or a combination thereof to produce a binder composition, wherein the one or more fillers, the one or more extenders, or the combination thereof is in particulate form.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A binder composition for making composite lignocellulose products, comprising: a mixture comprising a first plurality of particulates and a second plurality of particulates, wherein:
    the first plurality of particulates comprises a phenol-formaldehyde resole resin having a weight average molecular weight of 2,000 Daltons to about 8,000 Daltons,
    the second plurality of particulates comprises a filler, an extender, or a combination thereof,
    the first plurality of particulates is free of the filler and the extender,
    the second plurality of particulates is free of the phenol-formaldehyde resole resin,
    the binder composition comprises about 1 wt % to 10 wt % of the second plurality of particulates, based on a combined weight of the first plurality of particulates and the second plurality of particulates,
    the filler comprises a nut shell, a seed shell, a fruit pit, or any combination thereof, and
    the extender comprises corn flour, soy flour, wheat flour, or any combination thereof.

2. The binder composition of claim 1, wherein:
    the first plurality of particulates and the second plurality of particulates each have an average particle size of about 1 µm to about 150 µm,
    the binder composition consists essentially of the first plurality of particulates and the second plurality of particulates,
    the filler comprises pecan shell, peanut shell, or a combination thereof, and
    the extender comprises corn flour.

3. The binder composition of claim 1, wherein:
the binder composition has a packed bulk density of about 0.15 g/cm$^3$ to 0.55 g/cm$^3$,
the phenol-formaldehyde resole resin has a weight average molecular weight of 2,000 Daltons to about 6,000 Daltons and a formaldehyde to phenol molar ratio of about 1.9:1 to about 2.5:1,
the second plurality of particulates comprises the filler,
the filler comprises pecan shell, peanut shell, or a combination thereof,
the first plurality of particulates and the second plurality of particulates each have an average particle size of about 1 µm to about 150 µm, and
the binder composition comprises about 1 wt % to 9 wt % of the second plurality of particulates, based on the combined weight of the first plurality of particulates and the second plurality of particulates.

4. The binder composition of claim 1, wherein:
the phenol-formaldehyde resole resin has a weight average molecular weight of 2,000 Daltons to about 6,000 Daltons and a formaldehyde to phenol molar ratio of about 1.9:1 to about 2.5:1,
the second plurality of particulates comprises the extender,
the extender comprises corn flour,
the first plurality of particulates and the second plurality of particulates each have an average particle size of about 1 µm to about 150 µm, and
the binder composition comprises about 1 wt % to 9 wt % of the second plurality of particulates, based on the combined weight of the first plurality of particulates and the second plurality of particulates.

5. The binder composition of claim 1, wherein:
the filler comprises pecan shell, peanut shell, wheat shell, almond shell, corn husk, or any combination thereof,
the extender comprises corn flour, wheat flour, or a combination thereof, and
the binder composition comprises about 1 wt % to 7 wt % of the second plurality of particulates, based on the combined weight of the first plurality of particulates and the second plurality of particulates.

6. The binder composition of claim 1, wherein:
the filler comprises pecan shell, peanut shell, wheat shell, almond shell, corn husk, or any combination thereof, and
the binder composition comprises about 1 wt % to 9 wt % of the second plurality of particulates, based on the combined weight of the first plurality of particulates and the second plurality of particulates.

7. The binder composition of claim 1, wherein the phenol-formaldehyde resole resin has a weight average molecular weight ranging from 2,500 Daltons to about 8,000 Daltons, and wherein the binder composition has a fusion diameter of 15 mm to 35 mm.

8. The binder composition of claim 1, wherein:
the second plurality of particulates comprises the extender, and
the binder composition comprises about 1 wt % to 9 wt % of the second plurality of particulates, based on the combined weight of the first plurality of particulates and the second plurality of particulates.

9. The binder composition of claim 1, wherein:
the filler comprises pecan shell, peanut shell, wheat shell, almond shell, corn husk, or any combination thereof, and
the binder composition comprises 1 wt % to 7 wt % of the second plurality of particulates, based on the combined weight of the first plurality of particulates and the second plurality of particulates.

10. The binder composition of claim 1, wherein:
the binder composition consists essentially of the first plurality of particulates and the second plurality of particulates,
second plurality of particulates comprise the filler, and
the filler comprises pecan shell, peanut shell, wheat shell, almond shell, corn husk, or any combination thereof.

11. The binder composition of claim 1, wherein the binder composition comprises about 1 wt % to 9 wt % of the second plurality of particulates, based on the combined weight of the first plurality of particulates and the second plurality of particulates, and wherein the second plurality of particulates comprises the filler.

12. The binder composition of claim 1, wherein:
the phenol-formaldehyde resole resin has a formaldehyde to phenol molar ratio ranging from about 2:1 to about 2.65:1 and a weight average molecular weight of 3,000 Daltons to about 8,000 Daltons,
the second plurality of particulates comprises at least one of corn flour as the extender or pecan shell, peanut shell, or a combination thereof as the filler,
the first plurality of particulates and the second plurality of particulates each have an average particle size of about 1 µm to about 30 µm, and
the binder composition comprises about 1 wt % to 9 wt % of the second plurality of particulates, based on the combined weight of the first plurality of particulates and the second plurality of particulates.

13. A binder composition for making composite lignocellulose products, comprising:
a mixture comprising a first plurality of particulates and a second plurality of particulates, wherein:
the first plurality of particulates comprises a phenol-formaldehyde resole resin having a weight average molecular weight of about 2,000 Daltons to about 8,000 Daltons,
the second plurality of particulates comprises a filler, an extender, or a combination thereof,
the first plurality of particulates is free of the filler and the extender,
the second plurality of particulates is free of the phenol-formaldehyde resole resin,
the second plurality of particulates comprises the extender, and
the extender comprises a soy flour that comprises:
soy protein modified with compounds having the formula R$_2$NC(=X)NR$_2$, wherein each R is individually selected from the group consisting of H, a C$_1$-C$_4$ saturated group, and a C$_1$-C$_4$ unsaturated group, and X is selected from the group consisting of O, NH, and S;
soy protein modified with saturated and unsaturated alkali metal C$_8$-C$_{22}$ sulfate and sulfonate salts; or
any combination thereof.

14. A method for making a binder composition, comprising:
removing at least a portion of a liquid medium combined with a phenol-formaldehyde resole resin to produce a first plurality of particulates; and
combining the first plurality of particulates with a second plurality of particulates to produce a binder composition, wherein;
the binder composition comprises about 1 wt % to 10 wt % of the second plurality of particulates, based on a combined weight of the first plurality of particulates and the second plurality of particulates, the second plurality of particulates comprises one or more fillers, one or more extenders, or a combination thereof, the one or more filler comprise a nut shell, a seed shell, a fruit pit, or any combination thereof, and the one or more extenders comprise corn flour, soy flour, wheat flour, or any combination thereof.

15. A method for making a binder composition, comprising:

spray-drying an aerated liquid mixture comprising a phenol-formaldehyde resole resin to produce a first plurality of particulates, wherein the phenol-formaldehyde resole resin has a weight average molecular weight of 2,000 Daltons to about 8,000 Daltons; and combining the first plurality of particulates with a second plurality of particulates to produce a binder composition, wherein:

the second plurality of particulates comprises one or more fillers, one or more extenders, or a combination thereof, the one or more fillers comprise a nut shell, a seed shell, a fruit pit, or any combination thereof, and the one or more extenders comprise corn flour, soy flour, wheat flour, or any combination thereof, and the binder composition comprises about 1 wt % to 10 wt % of the second plurality of particulates, based on a combined weight of the first plurality of particulates and the second plurality of particulates.

16. A method for making a binder composition, comprising:

spray-drying an aerated liquid mixture comprising a phenol-formaldehyde resole resin to produce a first plurality of particulates, wherein the phenol-formaldehyde resole resin has a formaldehyde to phenol molar ratio ranging from about 2:1 to about 2.65:1; and combining the first plurality of particulates with a second plurality of particulates to produce a binder composition, wherein the second plurality of particulates comprises one or more fillers, one or more extenders, or a combination thereof, wherein the filler, if present, comprises pecan shells, wherein the extender, if present, comprises corn flour, and wherein the binder composition about 1 wt % to 10 wt % of the second plurality of particulates, based on the combined weight of the first plurality of particulates and the second plurality of particulates.

17. A method for making a composite product, comprising:

contacting a plurality of lignocellulose substrates with a particulate binder composition, the particulate binder composition comprising a mixture of a first plurality of particulates comprising a phenol-formaldehyde resole resin and a second plurality of particulates comprising a filler, an extender, or a combination thereof, wherein:

the first plurality of particulates is free of the filler and the extender, the second plurality of particulates is free of the phenol-formaldehyde resole resin the filler comprises a nut shell, a seed shell, a fruit pit, or any combination thereof, the extender comprises corn flour, soy flour, wheat flour, or any combination thereof, and the binder composition comprises about 1 wt % to 10 wt % of the second plurality of particulates, based on a combined weight of the first plurality of particulates and the second plurality of particulates; and at least partially curing the binder composition to produce a composite product.

18. The composite product of claim 17, wherein an amount of the binder composition is from about 0.5 wt % to about 5.5 wt %, based on a dry weight of the plurality of lignocellulose substrates.

19. The composite product of claim 18, wherein the phenol-formaldehyde resole resin has a weight average molecular weight of 2,000 Daltons to about 8,000 Daltons and a formaldehyde to phenol molar ratio of about 1.9:1 to about 2.5:1, and wherein the first plurality of particulates and the second plurality of particulates each have an average particle size of about 1 μm to about 150 μm.

20. A method for making a particulate binder composition, comprising:

synthesizing a liquid phenol-formaldehyde resole resin having weight average molecular weight of 2,000 Daltons to about 8,000 Daltons;

agitating the liquid phenol-formaldehyde resole resin to produce an aerated phenol-formaldehyde resole resin;

spray-drying the aerated phenol-formaldehyde resole resin to produce a spray-dried particulate phenol-formaldehyde resole resin; and combining the spray-dried particulate phenol-formaldehyde resole resin with one or more fillers, one or more extenders or a combination thereof to produce a binder composition, wherein:

the one or more fillers, the one or more extenders, or the combination thereof is in particulate form, the filler comprises a nut shell, a seed shell, a fruit pit, or any combination thereof, the extender comprises corn flour, soy flour, wheat flour, or any combination thereof, and the binder composition comprises about 1 wt % to 10 wt % of the second plurality of particulates, based on a combined weight of the first plurality of particulates and the second plurality of particulates.

* * * * *